Sept. 22, 1925.
R. F. SCHOENBACK
DEMOUNTABLE BRAKE LINING
Filed Aug. 25, 1919
1,554,600
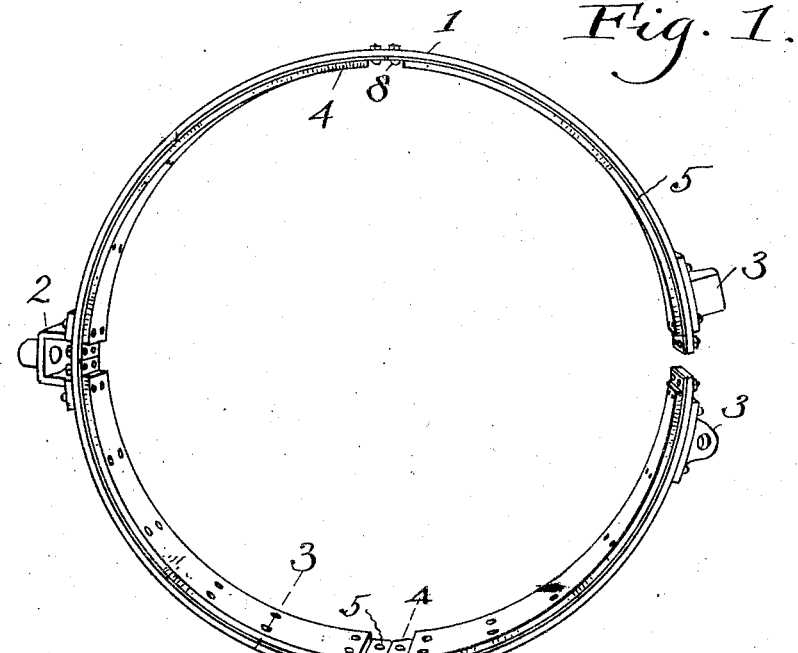
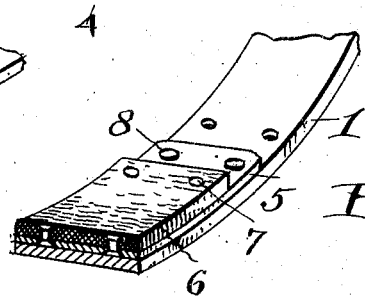
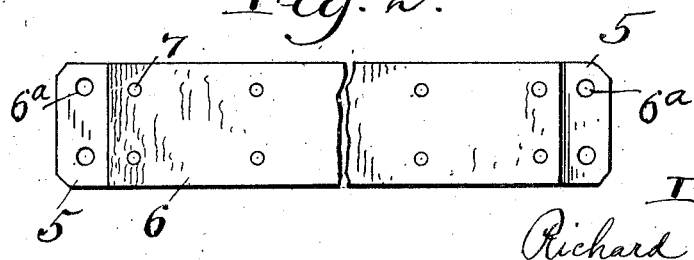
Inventor
Richard F. Schoenback
By Thurston Kwis & Hudson
attys.

Patented Sept. 22, 1925.

1,554,600

UNITED STATES PATENT OFFICE.

RICHARD F. SCHOENBACK, OF CLEVELAND, OHIO, ASSIGNOR, BY MESNE ASSIGNMENTS, TO HARTMAN BRAKE CORPORATION, OF NEW YORK, N. Y., A CORPORATION OF NEW YORK.

DEMOUNTABLE BRAKE LINING.

Application filed August 25, 1919. Serial No. 319,581.

*To all whom it may concern:*

Be it known that I, RICHARD F. SCHOENBACK, a citizen of the United States, residing at Cleveland, in the county of Cuyahoga and State of Ohio, have invented a certain new and useful Improvement in Demountable Brake Linings, of which the following is a full, clear, and exact description.

The present invention relates to a brake construction, more particularly intended for use as an automobile brake and the purpose of the invention is to provide a removable or demountable brake lining which may be readily removed and replaced without undue labor or consumption of an undue amount of time.

At the present time automobile brake linings, which usually consist of a strip of fabric, are riveted directly to the brake band and hence in the removal of these linings it is necessary to remove the wheel of the vehicle, remove the brake band, shear the rivets which hold the lining, apply to the brake band and make the necessary adjustments of the brake band with respect to the brake drum.

This operation consumes considerable time so that the expense of providing a new lining for a brake band is much greater than the mere recital of the operations involved would indicate.

The purpose of the present invention is to provide a removable sectional lining for a brake band, which is so mounted as to be readily removable from the brake band, and if it happens, as it frequently does, that but a portion of the brake band is worn and needs replacement, only that portion so needing replacement need be supplied.

Generally speaking the invention may be said to comprise the elements and the combinations thereof set forth in the accompanying claims.

Reference should be had to the accompanying drawings forming a part of this specification in which Fig. 1 is a perspective view showing a brake band employing my invention; Fig. 2 is a top plan view of a section of a brake band; Fig. 3 is a section upon the line 3—3 of Fig. 1; Fig. 4 is a section upon the line 4—4 of Fig. 1.

Referring to the drawings, 1 indicates a brake band of usual construction which at the portion 2 is mounted upon the frame of the vehicle and at the portions indicated at 3 is adapted to cooperate with a toggle lever construction such as is usually employed.

To the brake band 1 there is secured a plurality of sections which in general are indicated at 4. In the present instance, four such sections are shown but more or less number of sections may be used.

Each section comprises a thin metal strip 5 which is provided with holes indicated at $6^a$ adjacent the opposite ends thereof. Overlying the strip 5 is a strip of brake lining material 6. The material of which the strip 6 is composed may be of any suitable material, such materials being well known at the present time. The strip of material 6, is secured to the steel strip 5 by means of rivets 7, these rivets being distributed throughout the extent of the strip 6 to secure a proper contact between the strip 6 and the field strip 5.

The sections of the brake lining are secured to the brake strap 1 by means of bolts indicated at 8. These bolts extending through the openings $6^a$ in the steel strips and through suitable openings in the brake band 1. The bolts are secured in place by nuts.

As before stated, in the present instance four sections for the brake lining are provided and each section is independently secured to the brake strap so that as one section is worn to the point where it needs replacement and the other sections are not so worn, it will only be necessary to replace the section or sections which are worn. Inasmuch as the sections of the brake lining are secured to the brake band by bolts and nuts, it will be apparent that the brake lining sections are readily removable. In fact where the lining to be replaced is that, known as the external brake, that is to say the brake cooperating with the outside surface of the usual brake drum, it will not be necessary in applying my invention to remove the wheel or the brake band. Under such circumstances it will only be necessary to loosen the toggle arrangement secured to the portions 3, whereupon the worn sections may be removed and new sections introduced in their place.

By the use of a sectional brake lining which is demountable, as described, the time and labor cost incident to renewing the brake linings for an automobile brake is very materially reduced.

Having described my invention, I claim—

1. The combination with a brake band, of a lining therefor composed of a plurality of sections adapted to lie flat through their length of said brake band, each of said sections comprising a backing plate and a strip of friction material secured thereto, and fastening means traversing said backing plates and band adjacent each corner of each plate to independently and removably connect the individual sections to the brake band.

2. The combination with a brake band, of a lining therefor composed of a plurality of sections adapted to lie flat through their length of said brake band, each of said sections comprising a backing plate and a strip of friction material secured thereto, said plates having apertures adjacent the ends at each side thereof, and said brake band having apertures for alinement with said apertures in the segments, and means traversing said plates and bands to independently and removably connect the individual sections to the brake band.

In testimony whereof, I hereunto affix my signature.

RICHARD F. SCHOENBACK.